(12) United States Patent
Shinada

(10) Patent No.: US 11,604,165 B2
(45) Date of Patent: Mar. 14, 2023

(54) DISCHARGE IONIZATION DETECTOR

(71) Applicant: SHIMADZU CORPORATION, Kyoto (JP)

(72) Inventor: Kei Shinada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/341,486

(22) Filed: Jun. 8, 2021

(65) Prior Publication Data

US 2022/0034841 A1    Feb. 3, 2022

(30) Foreign Application Priority Data

Jul. 31, 2020  (JP) .............................. JP2020-130874

(51) Int. Cl.
*G01N 27/70*  (2006.01)

(52) U.S. Cl.
CPC .................................. *G01N 27/70* (2013.01)

(58) Field of Classification Search
CPC ............................... G01N 27/70; G01N 30/64
USPC ........................................................ 324/464
See application file for complete search history.

(56) References Cited

U.S. PATENT DOCUMENTS

| | | | |
|---|---|---|---|
| 5,767,683 A * | 6/1998 | Stearns ................... | G01N 27/70 73/28.02 |
| 6,699,392 B1 * | 3/2004 | Manginell .......... | G01N 30/6095 95/82 |
| 6,902,701 B1 * | 6/2005 | Hughes ................. | G01N 1/405 422/50 |

(Continued)

FOREIGN PATENT DOCUMENTS

| | | |
|---|---|---|
| JP | 2010-060354 A | 3/2010 |
| JP | 2016-217926 A | 12/2016 |

(Continued)

OTHER PUBLICATIONS

Kei Shinada et al., "Development of New Ionization Detector for Gas Chromatography by Applying Dielectric Barrier Discharge", Shimadzu Hyouron (Shimadzu Review), Mar. 29, 2013, pp. 255-263, vol. 69, Nos. 3/4.

D.S. Forsyth, "Pulsed discharge detector: theory and applications", Journal of Chromatography A, 1050 (2004), pp. 63-68.

(Continued)

*Primary Examiner* — Christopher P McAndrew
(74) *Attorney, Agent, or Firm* — Sughrue Mion, PLLC

(57) ABSTRACT

A discharge ionization detector includes: a gas passage (104, 120) through which an electric-discharge gas is to be passed; a plasma generation electrode (106-108) configured to generate an electric discharge in the gas passage so as to generate plasma from the electric-discharge gas; a sample-gas introduction section (124) through which a sample gas is introduced into the gas passage; a collection electrode (117) configured to collect ions generated from a sample with the plasma; a bias electrode (113) located between the plasma generation electrode and the collection electrode, and configured to create an electric field for guiding the charged particles to the collection electrode; and a DC power unit (131, 133) capable of independently controlling a voltage applied to the bias electrode and a voltage applied to the collection voltage. A peak-shape abnormality in a signal output can be suppressed by appropriately adjusting the voltages.

6 Claims, 9 Drawing Sheets

(56) References Cited

U.S. PATENT DOCUMENTS

| | | | |
|---|---|---|---|
| 8,123,841 B2* | 2/2012 | Masel | G01N 30/6095 |
| | | | 73/23.39 |
| 8,963,554 B2 | 2/2015 | Stearns et al. | |
| 10,197,532 B1* | 2/2019 | Manginell | G01N 27/70 |
| 2014/0053627 A1* | 2/2014 | Stearns | G01N 30/64 |
| | | | 73/23.4 |
| 2014/0145724 A1* | 5/2014 | Shinada | G01N 27/70 |
| | | | 324/464 |
| 2016/0341698 A1 | 11/2016 | Shinada | |

FOREIGN PATENT DOCUMENTS

| | | |
|---|---|---|
| JP | 2018-040721 A | 3/2018 |
| WO | 2012/169419 A1 | 12/2012 |

OTHER PUBLICATIONS

W.E. Wentworth et al., "Pulsed discharge helium ionization detector Universal detector for inorganic and organic compounds at the low picogram level", Journal of Chromatography A. 688 (1994), pp. 135-152.

\* cited by examiner

DISCHARGE IONIZATION DETECTOR

TECHNICAL FIELD

The present invention relates to a discharge ionization detector.

BACKGROUND ART

In recent years, a dielectric barrier discharge ionization detector which uses dielectric barrier discharge plasma to perform ionization (this type of detector is hereinafter abbreviated as the "BID") has been practically used as a new type of detector for gas chromatographs (GC). For example, see Patent Literature 1 or Non Patent Literature 1.

A BID includes a discharge electrode surrounding a duct line made of quartz glass, which is a dielectric material. An inert gas (e.g., helium or argon) is supplied into the duct line, and a high AC voltage with a low frequency is applied to the electrode to ionize the gas and form non-equilibrium atmospheric pressure plasma. Due mainly to the effect of the light emitted from the plasma, a sample component contained in a sample gas introduced into the duct line is ionized. The resulting ions are collected with a collection electrode to produce a detection signal corresponding to the number of ions, i.e., the amount of sample component. It is generally considered that the mechanism of the ionization of a sample component in a discharge ionization detector is the photoionization by high-energy vacuum ultraviolet light emitted from the plasma as well as the Penning ionization by metastable atoms produced by the plasma. As for the BID, as described in Non Patent Literature 1, it has been experimentally confirmed that the photoionization by vacuum ultraviolet light mainly contributes to the ionization of a sample component.

CITATION LIST

Patent Literature

Patent Literature 1: WO 2012/169419 A
Patent Literature 2: JP 2016-217926 A

Non Patent Literature

Non Patent Literature 1: Shinada and four other authors, "Development of New Ionization Detector for Gas Chromatography by Applying Dielectric Barrier Discharge", *Shimadzu Hyouron* (*Shimadzu Review*), Vol. 69, Nos. 3/4, Mar. 29, 2013

SUMMARY OF INVENTION

Technical Problem

In the previously described type of BID, a steady-state current, called a "baseline current" or "background current" (which are hereinafter called the "baseline current"), is normally detected even when no sample gas is suppled into the duct line, i.e., even when only the inert gas for plasma generation (which is hereinafter called the "plasma generation gas") and the carrier gas for sample introduction are flowing in the duct line. A change in the baseline current causes a significant amount of noise in or drift of the detection signal. Accordingly, the baseline current should be as low as possible.

There are various causes of the baseline current. In the case of a BID using helium (He) as the plasma generation gas, the main cause of the baseline current is an ion current resulting from the ionization of a trace amount of impurity contained in the plasma generation gas or carrier gas. This ionization occurs since the helium plasma has a high level of light energy that can ionize almost any compound. Accordingly, using a high-purity helium gas as the plasma generation gas or carrier gas is effective for reducing the baseline current. Another type of impurity causing the baseline current is hydrogen (H) and oxygen (O) released from the dielectric coating formed on the surface of the discharge electrode. Therefore, in the BID described in Patent Literature 1, a material with a low content of hydroxy group is selected for the dielectric coating. Furthermore, a high-resistance material is used for the insulator which separates the collection electrode from a bias electrode. This configuration is aimed at lowering the baseline current by reducing a leakage current which directly flows from the bias electrode to the collection electrode through the insulator.

On the other hand, the light energy of argon (Ar) plasma is considerably lower than that of helium plasma. Therefore, in the case of a BID using argon as the plasma generation gas, it is possible to infer that the ionization of the impurity in the gas is insignificant, and the influence of the ion current due to the impurity is considerably low. In reality, however, a baseline current whose amount needs to be considered as compared to the sensitivity of the detector is observed even in the BID using argon as the plasma generation gas. This is one of the factors preventing an improvement in the signal-to-noise ratio of the detection signal as well as an improvement of the lower limit of the detection. A possible cause of this baseline current is a surface leakage current which occurs since the discharge light causes a decrease in the surface resistance of the insulator which separates the bias electrode from the collection electrode. Accordingly, conventional devices are configured to achieve a low level of baseline current by reducing the width of a portion of the passage to partially block the discharge light which reaches the surface of the insulator (Patent Literature 2), or inserting a ground electrode between the bias electrode and the collection electrode to absorb the surface leakage current.

However, there were cases in which an abnormal output of a peak as shown in FIG. 7 was observed in a detector in which a low level of baseline was achieved in the previously described manner. In the example of FIG. 7, a positive peak which is a normal peak originating from a sample component is followed by an abnormal negative peak ("negative output"). Although such a negative peak can also occur in an insignificant form in the case where helium is used as the plasma generation gas, its occurrence is particularly noticeable in the case where argon is used as the plasma generation gas. Such a negative output will particularly have a relatively non-negligible magnitude for a low peak corresponding to a low-concentration sample. This will decrease the reproducibility of the peak area and lower the performance of the detector.

The present invention has been developed in view of the previously described point. Its objective is to suppress an abnormality in peak output in a discharge ionization detector.

Solution to Problem

The present inventor has conducted intensive studies to solve the previously described problem, and has discovered the fact that an abnormality in peak output can be suppressed by applying a voltage to the collection electrode. Thus, the present invention has been realized.

That is, a discharge ionization detector according to the present invention developed for solving the previously described problem includes:

a gas passage through which an electric-discharge gas is to be passed;

a plasma generation electrode configured to generate an electric discharge in the gas passage so as to generate plasma from the electric-discharge gas in the gas passage by the electric discharge;

a sample-gas introduction section through which a sample gas is introduced into the gas passage;

a collection electrode provided in the gas passage and configured to collect charged particles generated from a sample component in the sample gas with the plasma;

a bias electrode located between the plasma generation electrode and the collection electrode, and configured to create, within the gas passage, an electric field for guiding the charged particles to the collection electrode; and a DC power unit configured to produce a bias-electrode voltage to be applied to the bias electrode and a collection-electrode voltage to be applied to the collection voltage, where the bias-electrode voltage and the collection-electrode voltage are independently controllable.

Advantageous Effects of Invention

The discharge ionization detector according to the present invention having the previously described configuration can suppress an abnormality in peak output.

DESCRIPTION OF EMBODIMENTS

Embodiments of the present invention are hereinafter described with reference to the attached drawings.

First Embodiment

Figure 1:
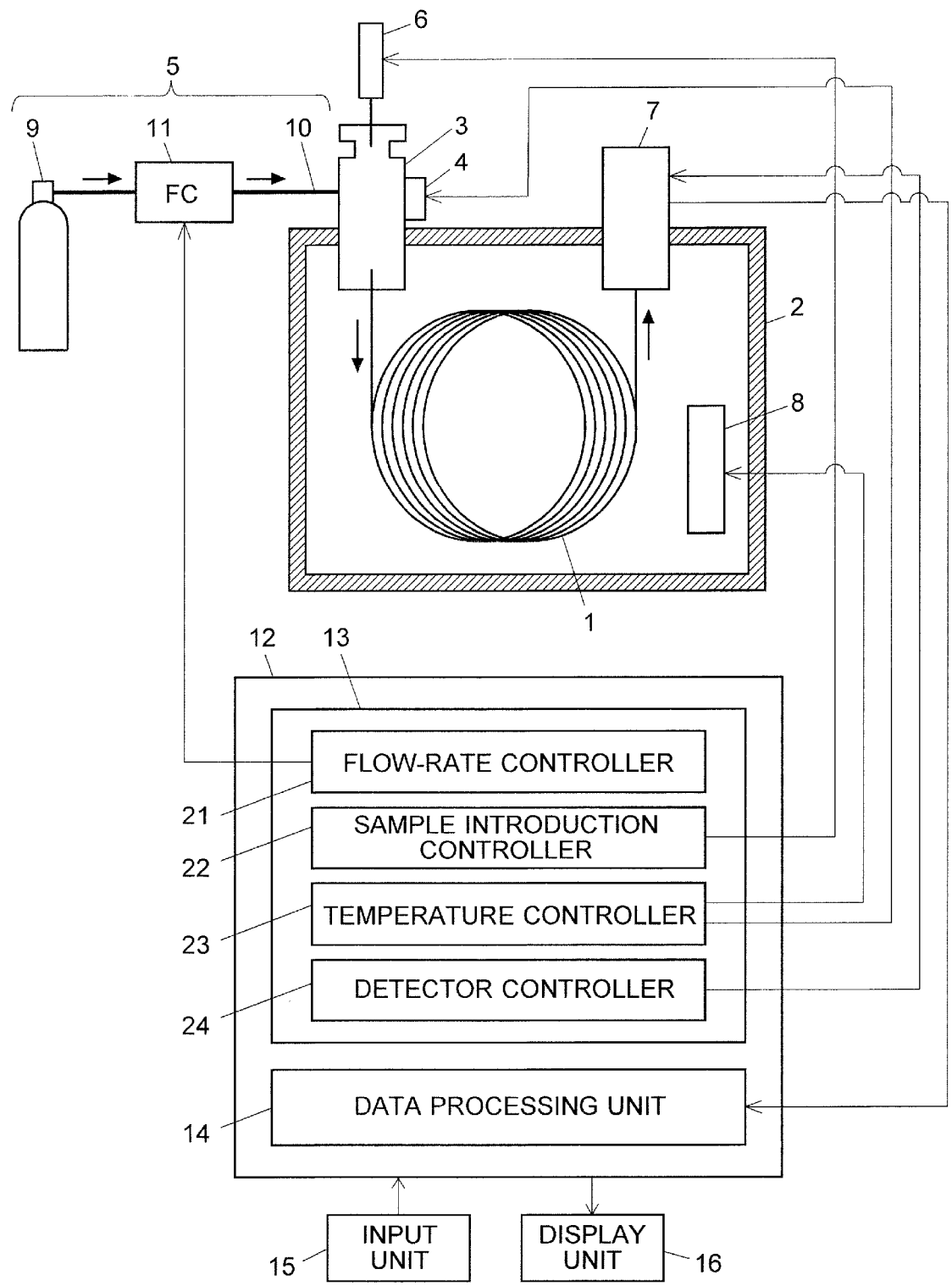
FIG. 1 is a schematic configuration diagram of a gas chromatograph device according to the first embodiment of the present invention.

FIG. 1 is a schematic configuration diagram of a gas chromatograph device (which is hereinafter appropriately called the "GC" device) according to the present embodiment. The present GC device includes a column oven 2 containing a capillary column 1, a sample vaporization chamber 3 connected to the entrance end of the capillary column 1, a carrier-gas supply section 5 configured to supply a carrier gas to the sample vaporization chamber 3, an injector 6 configured to inject a liquid sample into the sample vaporization chamber 3, and a BID 7 (which corresponds to the "discharge ionization detector" in the present invention) connected to the exit end of the capillary column 1. The column oven 2 further contains a heater 8 and a fan (not shown) for controlling the temperature within the column oven 2. The carrier-gas supply section 5 includes a gas cylinder 9 filled with a carrier gas (e.g., helium), a carrier-gas supply tube 10 configured to lead the carrier gas from the gas cylinder 9 to the sample vaporization chamber 3, and a flow controller (FC) 11 provided in the middle of the carrier-gas supply tube 10.

In the present GC device, the sample vaporization chamber 3 is heated with a heater 4. After a measurement has been initiated, a trace amount of liquid sample is dropped from the injector 6 into the sample vaporization chamber 3. The dropped liquid sample is quickly turned into vapor and carried into the capillary column 1 by the flow of the carrier gas. While the sample is passing through the capillary column 1, the various compounds contained in the sample ("sample components") are separated from each other, to be sequentially introduced into and detected by the BID 7.

The GC device in the present embodiment further includes a controlling-processing unit 12 including a personal computer (or other types of computers). The controlling-processing unit 12 includes a control section 13 and a data processing section 14. The control section 13 is configured to control the operations of the flow controller (FC) 11, heaters 4 and 8 as well as BID 7 and other related sections. More specifically, the control section 13 includes: a flow-rate controller 21 configured to control the FC 11; a sample introduction controller 22 configured to control the injector 6; a temperature controller 23 configured to control the heater 4 on the sample vaporization chamber 3 as well as the heater 8 and the fan (not shown) in the column oven 2; and a detector controller 24 configured to control the BID 7. The data processing section 14 (which corresponds to the "chromatogram creator" in the present invention) is configured to create a chromatogram based on the output signal from the BID 7. An input unit 15 to be used for receiving instructions from a user, and a display unit 16 to be used for visually checking information entered by the user or displaying a chromatogram, are connected to the controlling-processing unit 12. At least a portion of the functions of the controlling-processing unit 12 can be realized by running, on the aforementioned computer, dedicated control software previously installed on the same computer.

Figure 2:
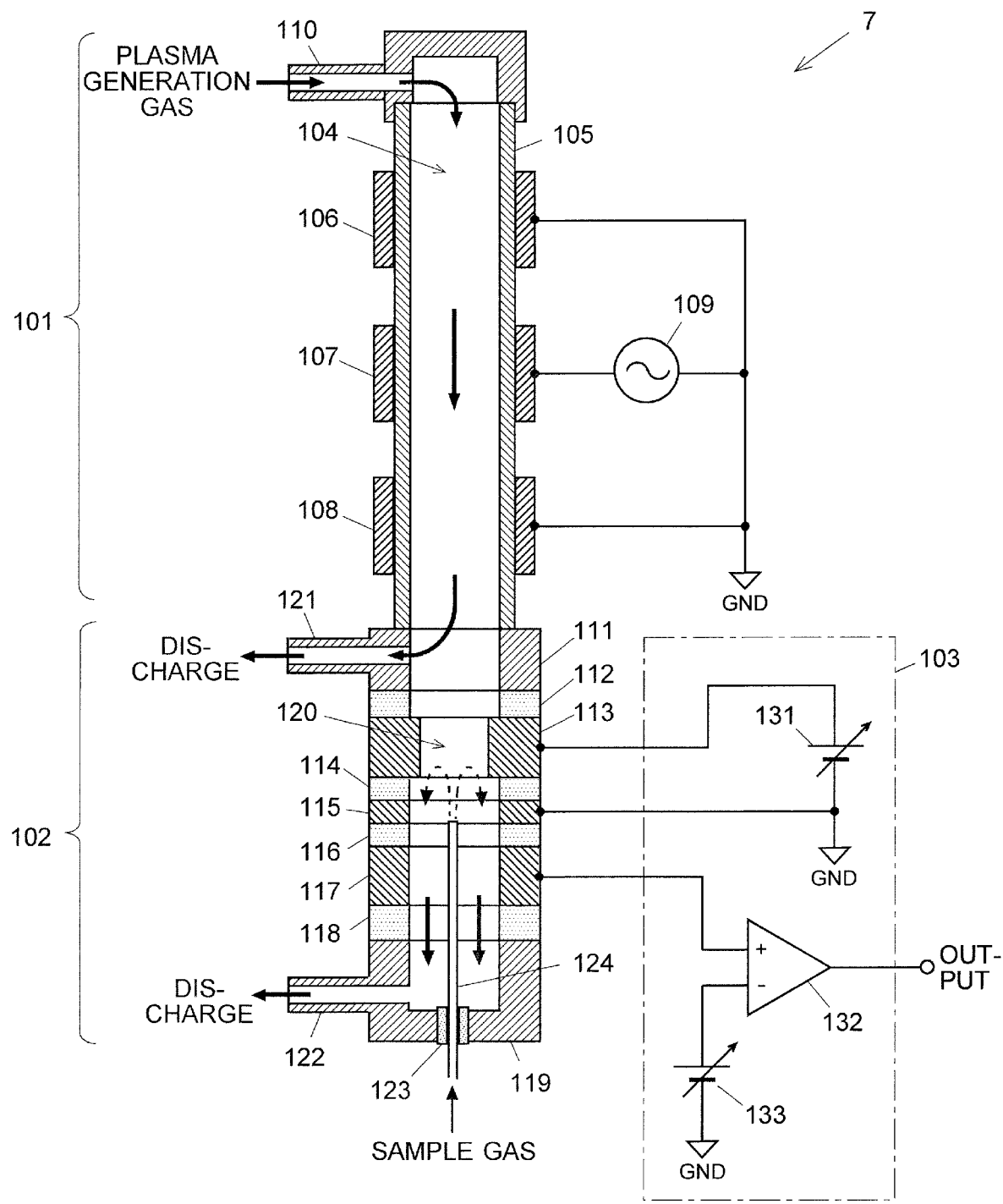
FIG. 2 is a schematic configuration diagram of a BID in the first embodiment.

The configuration of the BID 7 in the present GC device is schematically shown in FIG. 2. The BID 7 is roughly divided into a discharge section 101, charge collection section 102 and ion-current detection section 103.

The discharge section 101 includes: a cylindrical dielectric tube 105 having a first gas passage 104 formed inside; three annular electrodes arranged on the outer wall surface of the cylindrical dielectric tube 105 at predetermined intervals of space; and a high-voltage AC power source for excitation 109. The three annular electrodes are hereinafter individually called the upstream ground electrode 106, high-voltage electrode 107 and downstream ground electrode 108 from top to bottom. Those electrodes are also collectively called plasma generation electrodes 106-108. The plasma generation electrodes 106-108 are made of an electrically conductive material, such as stainless steel or copper. The cylindrical dielectric tube 105 is typically made of quartz, although it may be made of other kinds of dielectric materials, such as ceramic, glass or polymer. For convenience of description, the vertical direction is hereinafter defined with reference to the gas-flow direction in the cylindrical dielectric tube 105 (indicated by the downward arrows in FIG. 2) in such a manner that an upstream area is called an "upper" area, while a downstream area is called a "lower" area. It should be noted that this does not limit the spatial direction in which the BID 7 should be used.

The high-voltage electrode 107 is connected with the high-voltage AC power source for excitation 109. The upstream and downstream ground electrodes 106 and 108 are both grounded. In the BID 7 according to the present embodiment, as described earlier, the high-voltage electrode 107 is sandwiched between the upstream and downstream ground electrodes 106 and 108. This configuration prevents the plasma generated by the electric discharge from spreading into the upstream and downstream areas in the gas-flow direction, whereby the plasma generation area is effectively limited to the space between the two ground electrodes 106 and 108. The high-voltage AC power source for excitation 109 generates a high AC voltage having a frequency within a range of 1 kHz to 100 kHz, and more preferably, within a range of 5 kHz to 30 kHz (low frequency), with an amplitude of 5 kV to 10 kV.

A gas supply tube 110 is connected to the upper end of the cylindrical dielectric tube 105. A plasma generation gas (which corresponds to the "electric-discharge gas" in the present invention) doubling as a dilution gas is supplied through this gas supply tube 110 into the first gas passage 104. Since the wall of the cylindrical dielectric tube 105 is located between the first gas passage 104 and the plasma generation electrodes 106-108, this wall itself functions as a dielectric coating layer covering on the surface of the plasma generation electrodes 106-108, making it possible to induce the dielectric barrier discharge (which will be described later).

The charge collection section 102 includes the following components arranged from top to bottom in the mentioned order: a connection member 111 connected to the lower end of the cylindrical dielectric tube 105, a first insulating member 112, a bias electrode 113, a second insulating member 114, an additional electrode 115, a third insulating member 116, a collection electrode 117, a fourth insulating member 118, and a duct-line terminal member 119. The first, second third and fourth insulating members 112, 114, 116 and 118 are each made of a high-resistance material, such as ultra-high purity alumina or sapphire. Those members each have a cylindrical shape and internally form a second gas passage 120 connected to the first gas passage 104. The first and second gas passages 104 and 120 correspond to the "gas passage" in the present invention. A bypass exhaust tube 121 for discharging a portion of the plasma generation gas to the outside is connected to the circumferential surface of the connection member 111. The lower end of the duct-line terminal member 119 is closed. A sample-gas discharge tube 122 is connected to the circumferential surface of the duct-line terminal member 119. A through hole is formed in the bottom wall of the duct-line terminal member 119. A thin sample introduction tube 124 is inserted into the through hole via a sealing part 123. The lower end of the sample introduction tube 124 is connected to the exit end of the capillary column 1 via a joint (or similar element) which is not shown. A flow of gas containing sample components eluted from the capillary column 1 (this gas is hereinafter called the "sample gas") is supplied through this sample introduction tube 124 into the second gas passage 120. It is also possible to directly insert the exit end of the capillary column 1 into the through hole without providing the sample introduction tube 124.

The bias electrode 113 is connected to a DC power source for bias electrode 131 included in the ion-current detection section 103. The collection electrode 117 is connected to a current amplifier 132 which is also included in the ion-current detection section 103. The additional electrode 115 is grounded. This additional electrode 115 absorbs the leakage current which flows from the bias electrode 113 toward the collection electrode 117 through the insulator surface (i.e., the inner circumferential surface of the second insulating member 114 and that of the third insulating member 116). In other words, the additional electrode 115 prevents the leakage current from flowing from the bias electrode 113 to the collection electrode 117.

The ion-current detection section 103 further includes a DC power source for collection electrode 133 for applying a DC voltage to the collection electrode 117. The non-inverting input terminal (indicated by "+" in FIG. 2) of the current amplifier 132 is connected to the collection electrode 117. The inverting input terminal (indicated by "—" in FIG. 2) of the current amplifier 132 is connected to a ground (GND). The DC power source for collection electrode 133, which is located between the GND and the inverting input terminal, is connected to the collection electrode 117 via the current amplifier 132. This configuration allows the entire system of the collection electrode 117 and the current amplifier 132 to be set at a constant potential level from the GND (reference potential) without affecting the signal output from the current amplifier 132. Both the DC power source for bias electrode 131 and the DC power source for collection electrode 133 are variable-voltage power sources. Those power sources 131 and 133 operate under the control of the detector controller 24. The DC power source for bias electrode 131 and the DC power source for collection electrode 133 correspond to the "DC power unit" in the present invention.

An operation for detecting a sample component in a sample gas ejected from the capillary column 1 in this BID 7 is hereinafter schematically described. As indicated by the arrows in FIG. 2, a plasma generation gas is supplied through the gas supply tube 110 into the first gas passage 104 at a predetermined flow rate. The plasma generation gas is a gas that can be easily ionized. For example, it may be any one of the following kinds of gas: helium, argon, nitrogen, neon, xenon or krypton. A mixture of two or more of those kinds of gas may also be used. The plasma generation gas flows downward through the first gas passage 104. A portion of the gas is discharged through the bypass exhaust tube 121 to the outside, while the remaining portion acts as a dilution gas and further flows downward through the second gas passage 120, to be ultimately discharged through the sample-gas discharge tube 122 to the outside. Meanwhile, the sample gas flows from the outlet end of the capillary column 1 into the sample introduction tube 124, and is ejected from the ejection port at the end of the same tube 124 into the second gas passage 120. The sample gas is ejected in the opposite direction to the flowing direction of the dilution gas. However, as shown by the broken arrows in FIG. 2, the sample gas is promptly pushed back by the dilution gas and begins to move downward, being merged with the dilution gas.

When the plasma generation gas is flowing through the first gas passage 104 in the previously described manner, the high-voltage AC power source for excitation 109 applies a high AC voltage to the plasma generation electrodes 106-108. A dielectric barrier discharge is thereby induced within the plasma generation area sandwiched between the ground electrodes 106 and 108 in the first gas passage 104. The dielectric barrier discharge ionizes the plasma generation gas over a wide area, whereby a cloud of plasma (atmospheric pressure non-equilibrium micro plasma) is formed. The light emitted from the plasma travels through the first and second gas passages 104 and 120 to the area where the sample gas is present, and ionizes the sample component in the sample gas. The ions (or electrons) resulting from the ionization move toward the collection electrode 117 due to the effect of the electric field created by the DC voltage applied to the bias electrode 113. At the collection electrode 117, the ions (or electrons) give electric charges to, or receive them from, the same electrode. The collection electrode 117 is located at a certain distance from the plasma generation area.

An ion current corresponding to the number of ions (or electrons) originating from the sample component in the previously described manner, i.e., the amount of sample component, is sent to the current amplifier 132. The current amplifier 132 amplifies the ion current and outputs a detection signal. Thus, the BID 7 produces a detection signal corresponding to the amount (concentration) of sample component contained in the sample gas. The detection signal is sent to the data processing section 14. The data processing section 14 creates a chromatogram showing a temporal change in the detection signal. The chromatogram is displayed on the display unit 16.

In the GC device according to the present embodiment, the voltage applied from the DC power source for collection electrode 133 to the collection electrode 117 (the potential of the collection electrode 117) is adjusted by a characteristic procedure (which will be described later) in order to reduce the abnormality in peak shape in the BID 7. The adjustment of the applied voltage is performed with no sample gas introduced into the BID 7, i.e., under the condition that only the plasma generation gas and the carrier gas for sample introduction are flowing in the BID 7. Hereinafter, the voltage applied from the DC power source for bias electrode 131 to the bias electrode 113 is called the "bias-electrode voltage", and the voltage applied from the DC power source for collection electrode 133 to the collection electrode 117 is called the "collection-electrode voltage".

(1) Initially, the bias-electrode voltage is set to 0 V.

(2) Next, while the signal output from the current amplifier 132 is monitored, the value of the collection-electrode voltage is continuously varied over a specific range of voltages, and the collection-electrode voltage at which the signal output becomes 0 A is recorded (this voltage is hereinafter represented by Vo).

(3) Then, starting from Vo, the collection-electrode voltage is changed and adjusted so that the signal output from the current amplifier 132 will have a positive value (the collection-electrode voltage at this point is hereinafter called Vi).

(4) Subsequently, with the collection-electrode voltage fixed at Vi, the bias-electrode voltage is set to a value previously specified as the voltage for the ion collection under normal conditions (i.e., for the detection of the sample component).

In the previous description, it is assumed that the measurement target is a positive ion. When the measurement target is a negative ion or electron, the adjustment of the collection-electrode voltage in (3) is performed so that the signal output will have a negative value. That is to say, the adjustment in (3) is performed so that the signal output from the current amplifier 132 will have the same sign as the ion (or electron) to be collected with the collection electrode 117.

In (3), the voltage Vi only needs to be adjusted so that the signal output from the current amplifier 132 exceeds 0 V by the slightest possible amount. However, it is preferable to set it with a certain amount of allowance taking into account a change in the baseline current.

The value of the bias-electrode voltage to be set in (4) is specified, for example, within a range from a few V to 200 V (preferably, from 3 V to 200 V) in the case of collecting positive ions. In the case of collecting negative ions or electrons, the value is specified, for example, within a range from minus few V to −200 V (preferably, from −3 V to −200 V).

In the previously described procedure, the collection-electrode voltage is adjusted so that the signal output from the current amplifier 132 at a bias-electrode voltage of 0 V becomes positive (in the case of detecting a negative ion or electron, negative) with no sample gas introduced into the BID 7. The adjustment of the collection-electrode voltage in the present embodiment may also be performed in the course of an analysis of a sample (e.g., standard sample) by the GC device (i.e., with a sample gas introduced into the BID 7) in such a manner that the chromatogram created from the signal output during the analysis is monitored, and the collection-electrode voltage is gradually adjusted so that an abnormality in peak shape (e.g., the negative output mentioned earlier) located on the chromatogram will be reduced.

Thus, the previously described type of abnormality in peak shape can be suppressed by performing an output correction by applying an appropriate DC voltage to the collection electrode 117.

Figure 8:
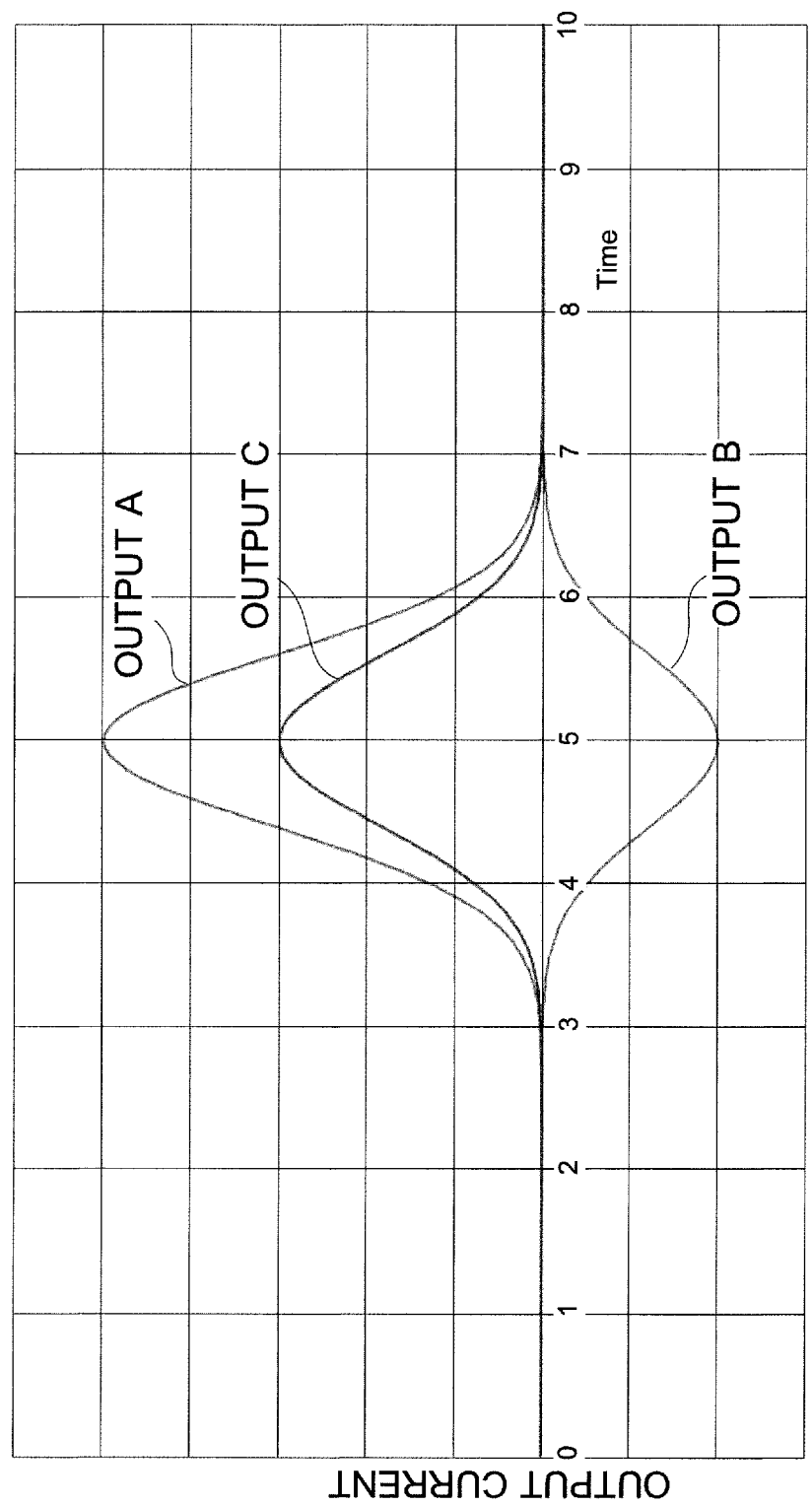
FIG. 8 is the first model diagram explaining the cause of an abnormality in peak shape in the conventional BID.
Figure 9:
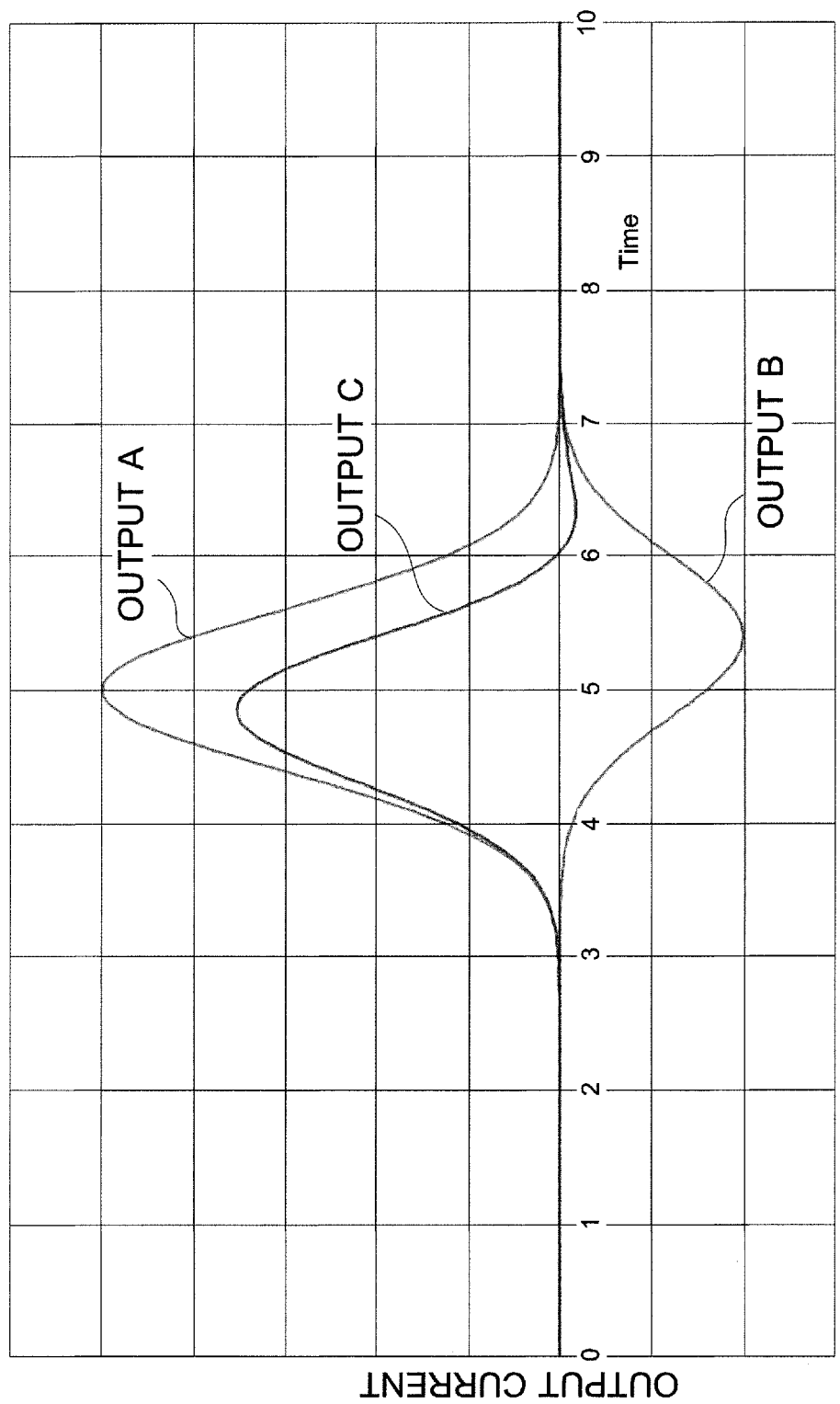
FIG. 9 is the second model diagram explaining the cause of an abnormality in peak shape in the conventional BID.

The mechanism by which the negative output occurs in a conventional BID is hereinafter described. In a BID, the insulating members provided in the charge collection section 102 (i.e., the first insulating member 112, second insulating member 114, third insulating member 116, and fourth insulating member 118) are exposed to the powerful light (particularly, ultraviolet radiation) emitted from the plasma in the discharge section 101, whereby negative charges are generated, causing the inner surfaces of those insulating members to be negatively charged ("charge up"). In this situation, the area near the upper end of the collection electrode 117 is strongly affected by the electric field created by the bias electrode 113, rather than the negative charges on the inner surface of the neighboring insulating member (i.e., third insulating member 116), since the area is close to the bias electrode 113 which is positively biased. On the other hand, the area near the lower end of the collection electrode 117 is more strongly affected by the negative charges on the inner surface of the neighboring insulating member (i.e., fourth insulating member 118) since the area is far from the bias electrode 113. This means that the distribution of the electric field in the length direction of the collection electrode 117 becomes non-uniform. Consequently, positive ions are attracted to the area near the upper end of the collection electrode 117, while negative ions (or electrons) are attracted to the area near the lower end of the same electrode. For simplification, it is hereinafter assumed that the output current from the collection electrode 117 is obtained by a simple integration of an electric current collected at position "A" near the upper end of the electrode 117 and an electric current collected at position "B" near the lower end of the electrode 117. If a chromatogram peak (normal distribution) originating from a sample gas can be individually measured at each of the positions "A" and "B", the chromatogram peak obtained from the output from position "A" (output "A") will be a positive peak, whereas the chromatogram peak obtained from the output from position "B" (output "B") will be a negative peak. If the change in concentration of the sample gas simultaneously occurs at the two positions "A" and "B", the outputs "A" and "B" will simultaneously reach their peak tops, as shown in FIG. 8, so that the peak obtained by the integration of the two peaks should have a shape slightly lower than the peak of output "A", like output "C" in FIG. 8. In reality, however, the peak-reaching time of output "B" is slightly later than that of output "A" since the sample gas flows in the top-to-bottom direction in FIG. 2 (i.e., in the direction from position "A" to position "B"). Consequently, as shown in FIG. 9, a negative output occurs in the peak tail of the peak (output "C") obtained by the integration of outputs "A" and "B".

By contrast, in the BID 7 according to the present embodiment, the previously described non-uniformity in the distribution of the electric field in the length direction of the collection electrode 117 can be corrected by applying the DC voltage Vi from the DC power source for collection electrode 133 to the collection electrode 117, so that an abnormal output of a peak, such as the previously described negative output at a peak tail in a chromatogram, can be suppressed.

Figure 7:
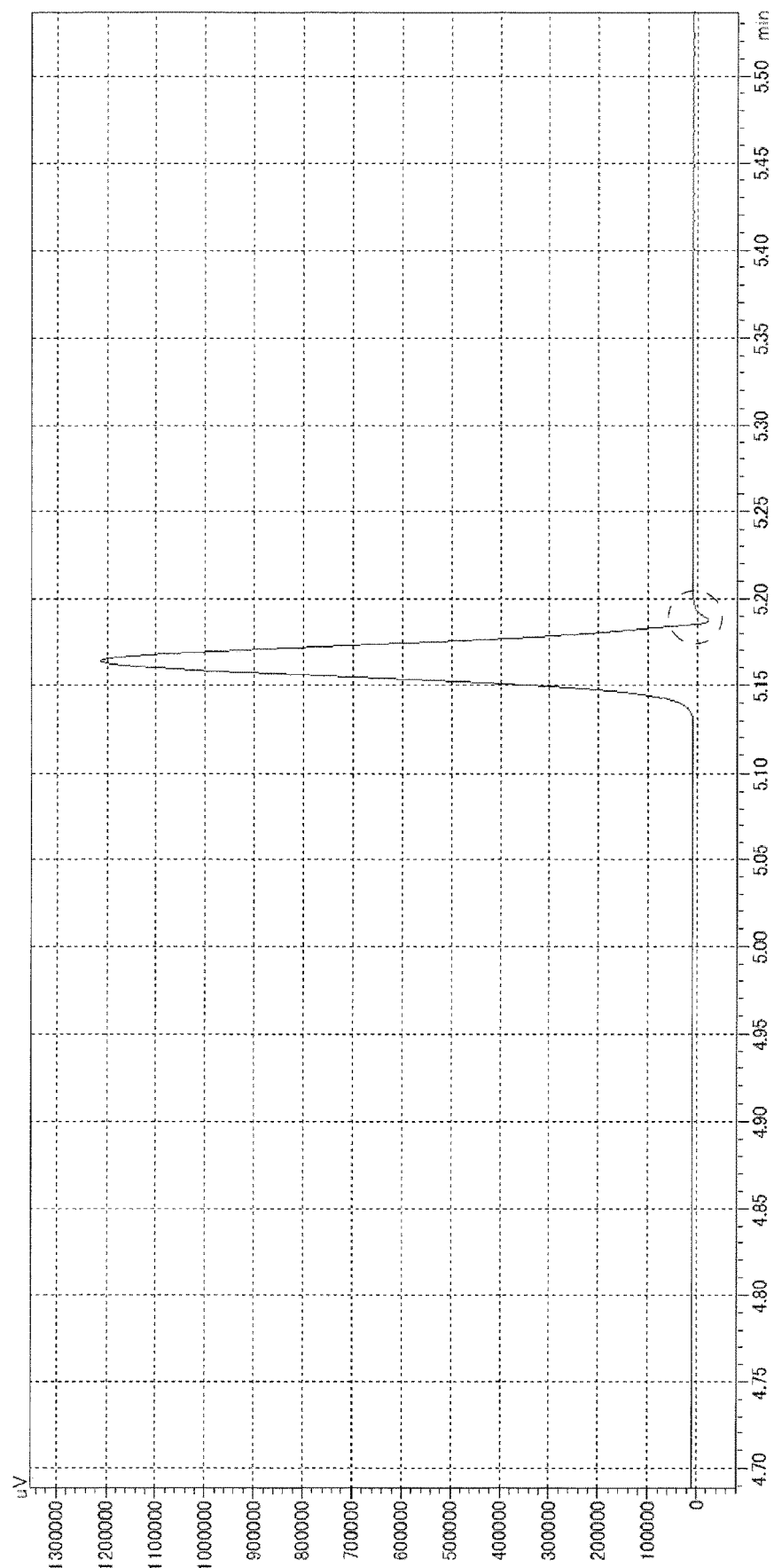
FIG. 7 is a diagram showing a chromatogram peak in a conventional BID.

As noted earlier, various kinds of gas can be used as the plasma generation gas which is introduced into the discharge section 101. The negative output as shown in FIG. 7 noticeably occurs in the case where argon is used as the plasma generation gas. Therefore, the present invention is particularly suitable for a BID 7 which uses argon as the plasma generation gas.

In principle, the adjustment of the collection-electrode voltage can be performed when the device is to be shipped from the manufacturer or when the device is set up immediately after its delivery to the user. At a later point in time, the user may also perform the readjustment if the user has judged that the readjustment is necessary (for example, when an abnormal output of a peak has been detected). The adjustment of the collection-electrode voltage may be manually performed by a serviceperson at the device manufacturer or a user (who are hereinafter collectively called the "operator"), or the detector controller 24 may be configured to respond to a predetermined operation performed with the input unit 15 by the operator and automatically conduct the readjustment by controlling the DC power source for bias electrode 131 and the DC power source for collection electrode 133. In the latter case, after receiving a signal indicating that no sample gas is being introduced from the sample introduction controller 22 into the capillary column 1 (i.e., a signal indicating that no sample gas is introduced into the second gas passage 120), the detector controller 24 operates the DC power source for bias electrode 131 and the DC power source for collection electrode 133 so as to set the bias-electrode voltage to 0 V, adjust the collection-electrode voltage so that the signal output obtained from the collection electrode 117 at the bias-electrode voltage of 0 V will have the same sign as the electric charge of the charged particles to be detected, and change the bias-electrode voltage to a value previously specified as the voltage for the sample measurement.

The BID 7 in the present embodiment may be modified so as to use a single power unit that applies DC voltages to both the bias electrode 113 and the collection electrode 117, in place of the two separate power sources, i.e., the power source for applying a DC voltage to the bias electrode 113 (DC power source for bias electrode 131) and the one for applying a DC voltage to the collection electrode 117 (DC power source for collection electrode 133). In that case, the single power unit should be configured so that the two voltages respectively from the power unit applied to the bias electrode 113 and the collection electrode 117 are independently controllable.

Figure 3:
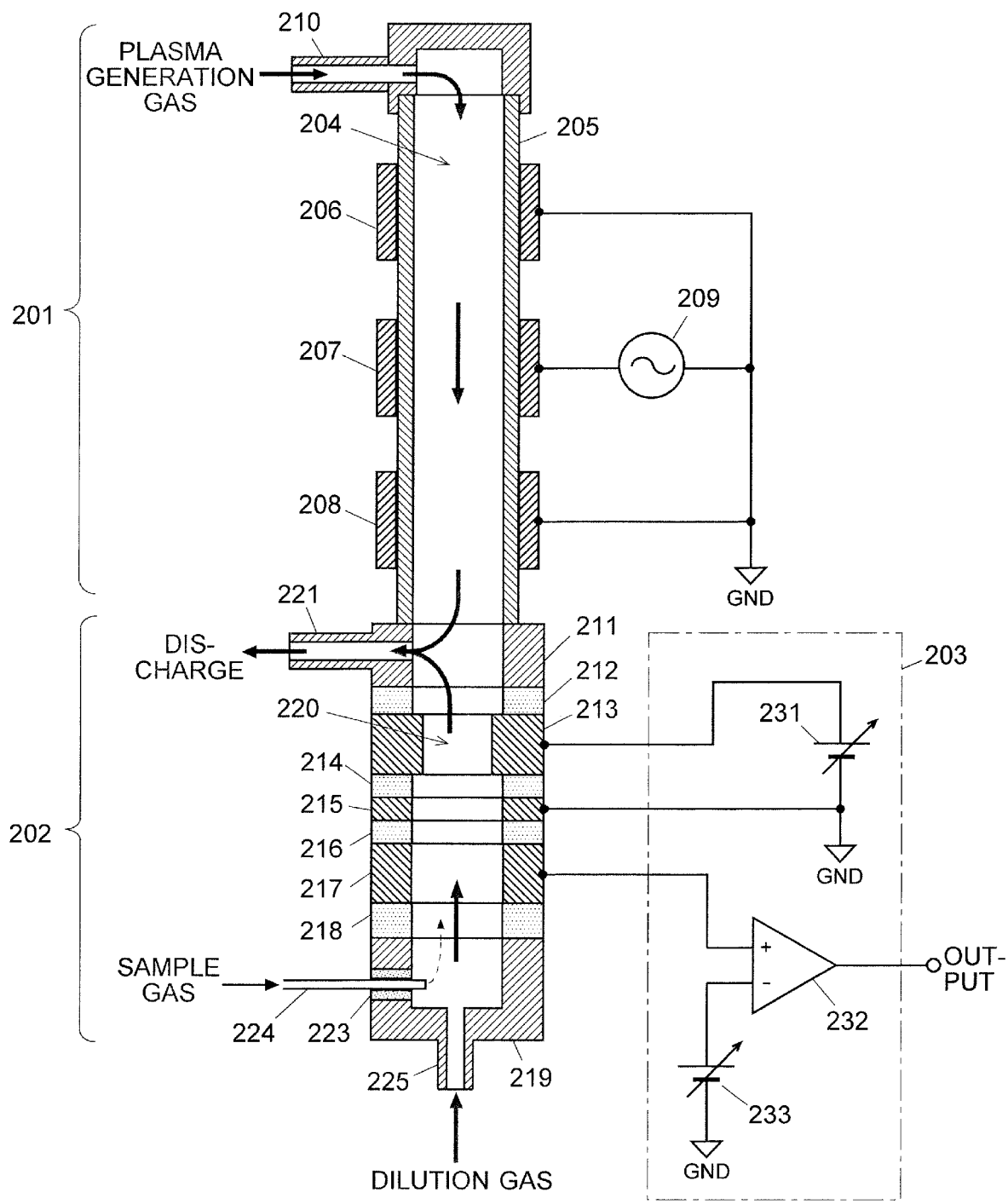
FIG. 3 is a schematic configuration diagram showing another example of the configuration of the BID in the first embodiment.

In the previous example, the charge collection section 102 of the BID is a counterflow type of charge collection section in which the sample gas is supplied in the direction from the downstream area to the upstream area of the second gas passage 120. The present invention is not limited to this type and can also be applied in a BID having a forward-flow type of charge collection section. FIG. 3 shows one example of this type of configuration. The components which have identical or corresponding components in FIG. 2 are denoted by reference signs with the last two digits identical to those used in FIG. 2, and the descriptions of those components will be appropriately omitted. The present BID has a dilution-gas supply tube 225 connected to the lower surface of the duct-line terminal member 219, and a sample introduction tube 224 penetrating through the circumferential wall of the duct-line terminal member 219. The dilution gas is supplied through the dilution-gas supply tube 225 into the second gas passage 220, while the sample gas is supplied from the sample introduction tube 224 into the second gas passage 220. As shown by the arrows in FIG. 3, the flowing direction of the dilution gas in the second gas passage 220 of the present BID is opposite to that of the dilution gas in the BID shown in FIG. 2. That is to say, the dilution gas flows upward in the second gas passage 220 and merges with the flow of the plasma generation gas coming from the first gas passage 204, to be ultimately discharged through the exhaust tube 221 to the outside. The configuration of the ion-current detection section 203, and the method for adjusting the collection-electrode voltage, are identical to those described in the previous example, and therefore, will not be described here.

Second Embodiment

The present invention is not limited to BIDs. It can also be applied in various types of discharge ionization detectors configured to ionize a sample by mainly using light emitted from plasma generated by an electric discharge, and to detect an electric current originating from the resulting ions.

Figure 4:
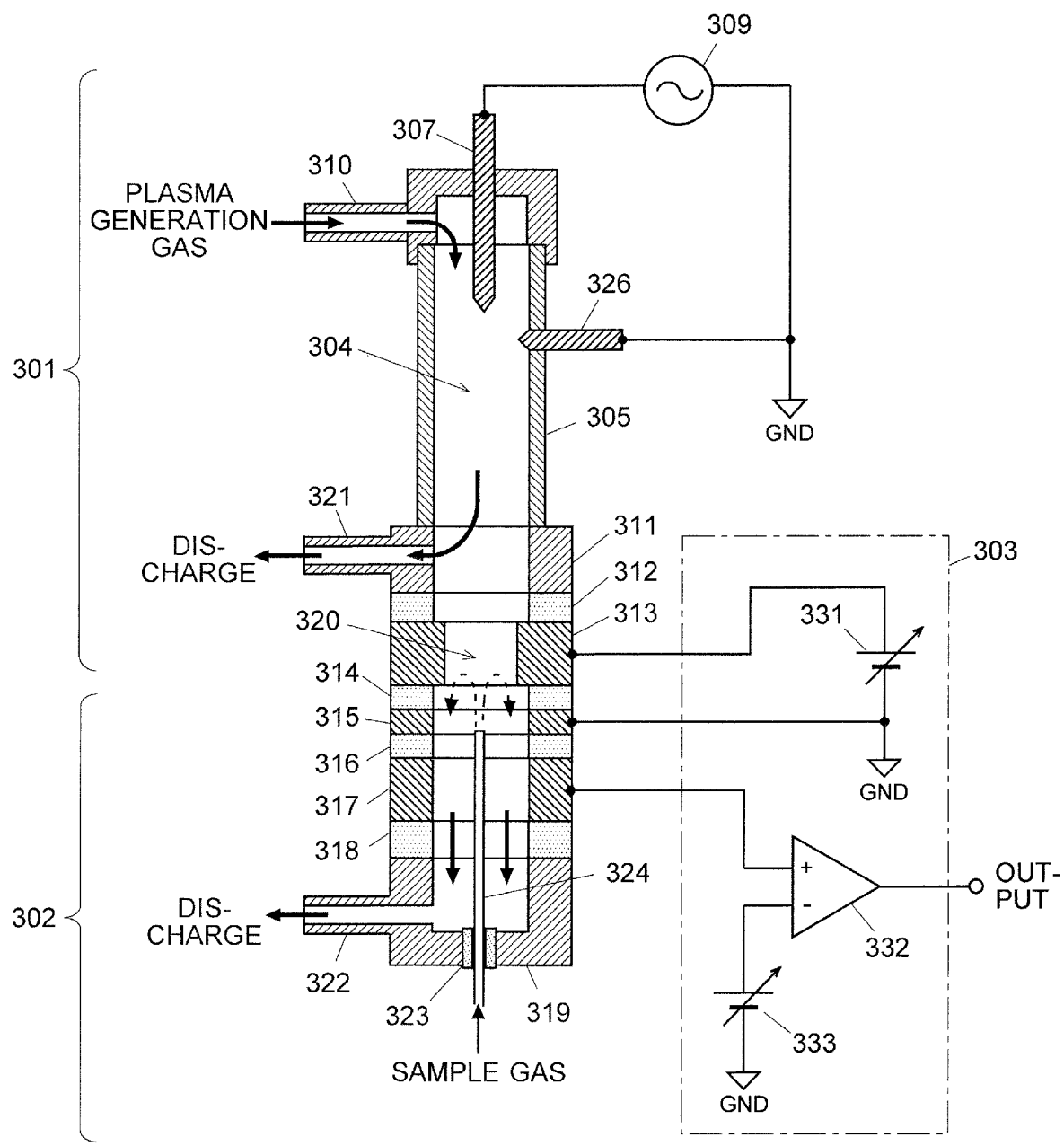
FIG. 4 is a schematic configuration diagram of a DID according to the second embodiment of the present invention.

An embodiment of the present invention applied in a different type of discharge ionization detector (which is hereinafter abbreviated as the "DID") is hereinafter described with reference to FIG. 4. The components which have identical or corresponding components in the BID according to the first embodiment are denoted by reference signs with the last two digits identical to those used in the first embodiment, and the descriptions of those components will be appropriately omitted.

The present DID includes a high-voltage electrode 307 and a ground electrode 326 which are both rod-shaped electrodes. The tips of those electrodes 307 and 326 are exposed to the inside of the cylindrical dielectric tube 305. The high-voltage electrode 307 is connected to a high-voltage AC power source for excitation 309. The ground electrode 326 is grounded. In a DID, the plasma generation gas is excited by a high-voltage pulse discharge. Sample molecules are ionized by the light energy which is generated when the excited molecules of the plasma generation gas return to the ground state. The resulting charged particles (ions or electrons) are collected with the collection electrode 317 to obtain a detection signal corresponding to the amount (concentration) of sample component.

The previously described type of abnormality in peak shape can be suppressed also in this type of DID by performing an output correction by applying an appropriate DC voltage to the collection electrode 317. The configuration of the ion-current detection section 303, and the method for adjusting the collection-electrode voltage, are identical to those described in the first embodiment, and therefore, will not be described here. Although the DID shown in FIG. 4 has a counterflow type of charge collection section 302, the present invention can be similarly applied in a DID having a forward-flow type of charge collection section.

Third Embodiment

The present invention is not limited to discharge ionization detectors having a charge collection section formed by vertically stacking cylindrical electrodes and insulating members in the previously described manner. It can also be applied in a chip-type discharge ionization detector including an insulator substrate on which electrode patterns are formed.

Figure 5:
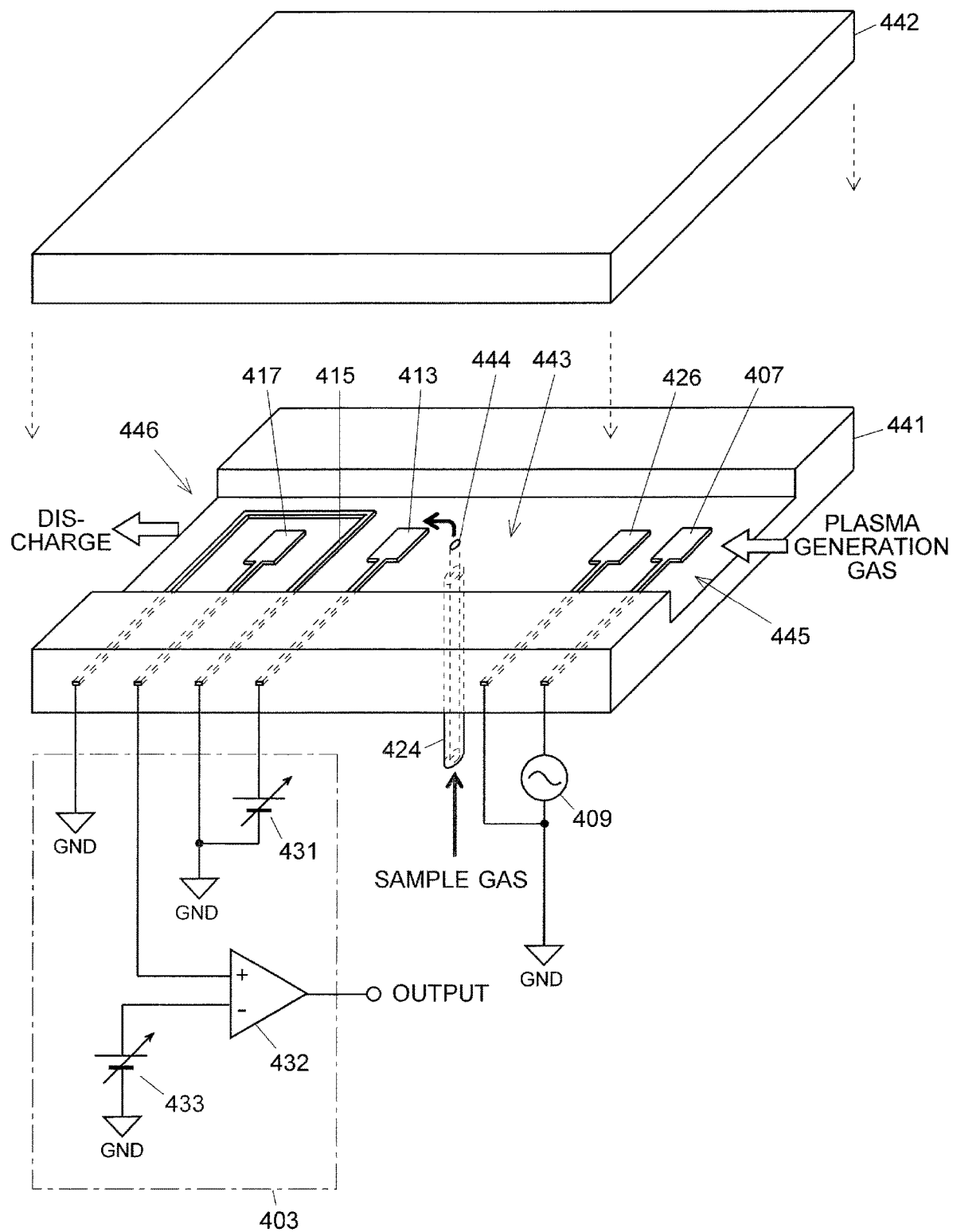
FIG. 5 is a schematic configuration diagram of a chip-type DID according to the third embodiment of the present invention.

An embodiment of the present invention applied in a chip-type DID is hereinafter described with reference to FIG. 5. The components which have identical or corresponding components in FIG. 4 are denoted by reference signs with the last two digits identical to those used in FIG. 4, and the descriptions of those components will be appropriately omitted. The DID according to the present embodiment includes a first substrate 441 and a second substrate 442 both of which are made of an insulating material. A depressed portion 443 shaped like a groove is formed on the upper surface of the first substrate 441. A high-voltage electrode 407, ground electrode 426, bias electrode 413, additional electrode 415 and collection electrode 417 are formed on the bottom inner surface of the depressed portion 443. The high-voltage electrode 407 is connected to a high-voltage AC power source for excitation 409. The ground electrode 426 is grounded. The bias electrode 413 is connected to a DC power source for bias electrode 431. The additional electrode 415 is grounded. The collection electrode 417 is connected to the non-inverting input terminal (plus-side input terminal) of the current amplifier 432, while a DC power source for collection electrode 433 is connected to the inverting input terminal (minus-side input terminal) of the current amplifier 432.

An opening 444 for introducing a sample gas is formed at the center of the depressed portion 443. A sample introduction tube 424 is connected to the opening 444 from the lower side of the first substrate 441. The second substrate 442, which has a flat lower surface, is adhered to the upper surface of the first substrate 441, whereby a gas passage surrounded by the depressed portion 443 of the first substrate 441 and the lower surface of the second substrate 442 is formed. The two ends of this gas passage are respectively open at the two opposite sides of the first substrate 441. One of the two openings is a gas introduction port 445. The other opening is a gas discharge port 446.

In the present DID, a plasma generation gas is introduced from the gas introduction port 445, while a sample gas is introduced through the sample introduction tube 424 into the gas passage. A high pulsed voltage is applied between the high-voltage electrode 407 and the ground electrode 426 by the high-voltage AC power source for excitation 409, whereby plasma is generated in the upstream area of the gas passage (this area corresponds to the discharge section). Due mainly to the light energy from the plasma, the sample gas in the downstream area of the gas passage (this area corresponds to the charge collection section) is ionized, and the electric charges originating from the resulting ions are collected with the collection electrode 417.

The previously described type of abnormality in peak shape can be suppressed also in such a chip-type DID by performing an output correction by applying an appropriate DC voltage to the collection electrode 417. The method for adjusting the collection-electrode voltage is identical to the method described in the first embodiment, and therefore, will not be described here. The present invention is not limited to the configuration shown in FIG. 5. It can also be similarly applied in other types of discharge ionization detectors (e.g., a BID) having a chip-type configuration.

EXAMPLE

An experimental measurement has been performed to confirm the effect of the present invention. A GC device according to the first embodiment (i.e., a GC device having a BID as shown in FIG. 2 as the detector) was used for the measurement. Argon was used as the plasma generation gas.

With no sample introduced into the capillary column, the bias-electrode voltage was initially set to 0 V. While the signal output from the current amplifier was monitored, the value of the collection-electrode voltage was continuously changed over a specific range of voltages. The voltage Vo at which the signal output became 0 A was −0.08 V. Starting from Vo, the collection-electrode voltage was changed and adjusted so that the signal output from the current amplifier 132 would have a positive value. The voltage Vi of the DC power source for collection electrode 133 in this step was −0.1 V. Subsequently, with the bias-electrode voltage set at a voltage for the sample measurement (in the present example, 10 V), a chromatographic measurement using the aforementioned GC device was performed. Dodecane was used as the sample. For comparison, similar measurements with the collection-electrode voltage set at 0 V and −0.04 V were also performed.

Figure 6:
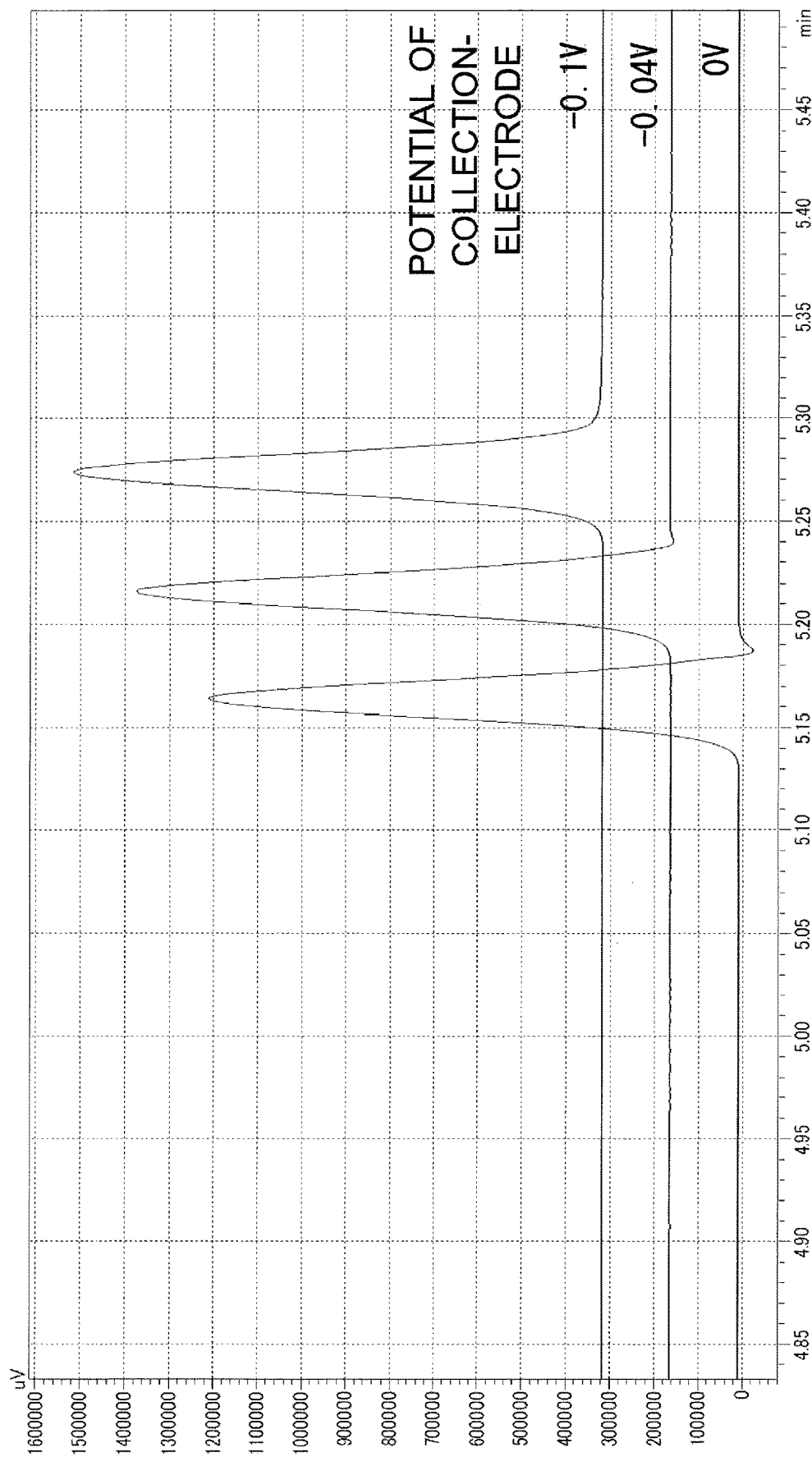
FIG. 6 is a diagram showing chromatogram peaks obtained with a gas chromatograph device according to the present invention.

FIG. 6 shows chromatogram peaks obtained by those measurements. It should be noted that the chromatograms in FIG. 6 are intentionally shifted from each other in both the vertical and horizontal directions to facilitate the comparison of their peak shapes. As is evident from FIG. 6, a slight negative output occurred immediately after the positive peak when the bias-electrode voltage was 0 V and the collection-electrode potential was 0 V or −0.04 V which corresponded to a negative value of the signal output. By comparison, when the collection-electrode potential was set at −0.1 V, the negative output disappeared, and a normal chromatogram peak was obtained.

[Various Modes of Invention]

A person skilled in the art can understand that the previously described illustrative embodiments are specific examples of the following modes of the present invention.

(Clause 1) A discharge ionization detector according to one mode of the present invention includes:

a gas passage through which an electric-discharge gas is to be passed;

a plasma generation electrode configured to generate an electric discharge in the gas passage so as to generate plasma from the electric-discharge gas in the gas passage by the electric discharge;

a sample-gas introduction section through which a sample gas is introduced into the gas passage;

a collection electrode provided in the gas passage and configured to collect charged particles generated from a sample component in the sample gas with the plasma;

a bias electrode located between the plasma generation electrode and the collection electrode, and configured to create, within the gas passage, an electric field for guiding the charged particles to the collection electrode; and a DC power unit configured to produce a bias-electrode voltage to be applied to the bias electrode and a collection-electrode voltage to be applied to the collection voltage, where the bias-electrode voltage and the collection-electrode voltage are independently controllable.

(Clause 2) The discharge ionization detector described in Clause 1 may further include a controller configured to control the DC power unit so as to automatically adjust the collection-electrode voltage so that a signal output obtained from the collection electrode has the same sign as the electric charge of the charged particles to be detected, and to change the bias-electrode voltage to a value previously specified as a voltage for a sample measurement.

(Clause 3) A method for adjusting a discharge ionization detector according to one mode of the present invention is a method for adjusting a discharge ionization detector including:

a gas passage through which an electric-discharge gas is to be passed;

a plasma generation electrode configured to generate an electric discharge in the gas passage so as to generate plasma from the electric-discharge gas in the gas passage by the electric discharge;

a collection electrode provided in the gas passage and configured to collect charged particles generated from a sample component in a sample gas with the plasma; and a bias electrode configured to generate an electric field for guiding the charged particles to the collection electrode, where the method includes:

a step of setting a bias-electrode voltage, which is a DC voltage applied to the bias electrode, to 0 V under the condition that the sample gas is not introduced into the gas passage;

a step of adjusting a collection-electrode voltage, which is a DC voltage applied to the collection electrode, so that a signal output obtained from the collection electrode under the condition that the bias-electrode voltage is set at 0 V has the same sign as the charge of the charged particles to be detected; and a step of changing the bias-electrode voltage to a value previously specified as a voltage for a sample measurement.

(Clause 4) A gas chromatograph device according to one mode of the present invention includes a column and a detector configured to detect sample components separated from each other by the column, where the detector is the discharge ionization detector described in Clause 1 or 2.

(Clause 5) A method for adjusting a gas chromatograph device according to one mode of the present invention is a method for adjusting a gas chromatograph device including:

a column;

a detector configured to detect sample components separated from each other by the column; and a chromatogram creator configured to create a chromatogram based on an output signal from the detector, the detector being a discharge ionization detector including:

a gas passage through which an electric-discharge gas is to be passed;

a plasma generation electrode configured to generate an electric discharge in the gas passage so as to generate plasma from the electric-discharge gas in the gas passage by the electric discharge;

a collection electrode provided in the gas passage and configured to collect charged particles generated from a sample component in a sample gas with the plasma; and a bias electrode configured to generate an electric field for guiding the charged particles to the collection electrode, where the method includes a step of adjusting a collection-electrode voltage, which is a DC voltage applied to the collection electrode, so as to reduce an abnormality in a peak shape on the chromatogram created by the chromatogram creator, while performing a sample analysis using the gas chromatograph device.

By the discharge ionization detector described in Clause 1 or 2, the method for adjusting a discharge ionization detector described in Clause 3, the gas chromatograph device described in Clause 4, or the method for adjusting a gas chromatograph device described in Clause 5, the previously described type of abnormality in peak shape can be suppressed by performing an output correction by applying an appropriate DC voltage to the collection electrode.

REFERENCE SIGNS LIST

1 . . . Capillary Column
7 . . . Dielectric Barrier Discharge Ionization Detector (BID)
101 . . . Discharge Section
104 . . . First Gas Passage
106 . . . Upstream Ground Electrode
107 . . . High-Voltage Electrode
108 . . . Downstream Ground Electrode
109 . . . High-Voltage AC Power Source for Excitation
102 . . . Charge Collection Section
120 . . . Second Gas Passage
113 . . . Bias Electrode
115 . . . Additional Electrode
117 . . . Collection Electrode
124 . . . Sample Introduction Tube
103 . . . Ion-Current Detection Section
131 . . . DC Power Source for Bias Electrode
132 . . . Current Amplifier
133 . . . DC Power Source for Collection Electrode
12 . . . Controlling-Processing Unit
13 . . . Control Section
24 . . . Detector Controller
14 . . . Data Processing Section

The invention claimed is:

1. A discharge ionization detector comprising:

a gas passage through which an electric-discharge gas is to be passed;

a plasma generation electrode configured to generate an electric discharge in the gas passage so as to generate plasma from the electric-discharge gas in the gas passage by the electric discharge;

a sample-gas introduction section through which a sample gas is introduced into the gas passage;

a collection electrode provided in the gas passage and configured to collect charged particles generated from a sample component in the sample gas with the plasma;

a bias electrode located between the plasma generation electrode and the collection electrode, and configured to create, within the gas passage, an electric field for guiding the charged particles to the collection electrode; and a DC power unit configured to produce a bias-electrode voltage to be applied to the bias electrode and a collection-electrode voltage to be applied to the collection electrode, where the bias-electrode voltage and the collection-electrode voltage produced are independently controllable from each other.

2. The discharge ionization detector according to claim 1, further comprising:

a controller configured to control the DC power unit so as to automatically adjust the collection-electrode voltage applied to the collection-electrode so that a signal output obtained from the collection electrode has the same sign as the electric charge of the charged particles to be detected, and to change the bias-electrode voltage to a value previously specified as a voltage for a sample measurement.

3. A method for adjusting a discharge ionization detector including:

a gas passage through which an electric-discharge gas is to be passed;

a plasma generation electrode configured to generate an electric discharge in the gas passage so as to generate plasma from the electric-discharge gas in the gas passage by the electric discharge;

a collection electrode provided in the gas passage and configured to collect charged particles generated from a sample component in a sample gas with the plasma; and a bias electrode configured to generate an electric field for guiding the charged particles to the collection electrode, wherein the method comprises:

a step of setting a bias-electrode voltage, which is a DC voltage applied to the bias electrode, to 0 V under the condition that the sample gas is not introduced into the gas passage;

a step of adjusting a collection-electrode voltage, which is a DC voltage applied to the collection electrode, so that a signal output obtained from the collection electrode under the condition that the bias-electrode voltage is set at 0 V has the same sign as the charge of the charged particles to be detected; and a step of changing the bias-electrode voltage to a value previously specified as a voltage for a sample measurement.

4. A gas chromatograph device including a column and a detector configured to detect sample components separated from each other by the column, wherein the detector is the discharge ionization detector according to claim 1.

5. A method for adjusting a gas chromatograph device including:

a column;

a detector configured to detect sample components separated from each other by the column; and a chromatogram creator configured to create a chromatogram based on an output signal from the detector, the detector being a discharge ionization detector including:

a gas passage through which an electric-discharge gas is to be passed;

a plasma generation electrode configured to generate an electric discharge in the gas passage so as to generate plasma from the electric-discharge gas in the gas passage by the electric discharge;

a collection electrode provided in the gas passage and configured to collect charged particles generated from a sample component in a sample gas with the plasma; and a bias electrode configured to generate an electric field for guiding the charged particles to the collection electrode, wherein the method comprises a step of adjusting a collection-electrode voltage, which is a DC voltage applied to the collection electrode, so as to reduce an abnormality in a peak shape on the chromatogram created by the chromatogram creator, while flowing a sample gas through the detector using the gas chromatograph device.

6. The discharge ionization detector according to claim 1, wherein the DC power unit has a DC power source for the bias electrode that applies the bias-electrode voltage to the bias electrode and a DC power source for the collection electrode that applies the collection-electrode voltage to the collection electrode.

\* \* \* \* \*